United States Patent [19]
Maeda

[11] Patent Number: 5,485,441
[45] Date of Patent: Jan. 16, 1996

[54] METHOD OF OPTICALLY READING INFORMATION, OPTICAL PICKUP APPARATUS AND OPTICAL REPRODUCING APPARATUS

[75] Inventor: Takanori Maeda, Tsurugashima, Japan

[73] Assignee: Pioneer Electronic Corporation, Tokyo, Japan

[21] Appl. No.: 314,233

[22] Filed: Sep. 28, 1994

[30] Foreign Application Priority Data

Oct. 1, 1993 [JP] Japan .................................... 5-247156

[51] Int. Cl.$^6$ ................................................. G11B 7/085
[52] U.S. Cl. ........................ 369/44.37; 369/109; 369/111; 369/121
[58] Field of Search ............................. 369/44.37, 44.38, 369/59, 121, 109, 111, 100, 101, 102, 104, 103, 107

[56] References Cited

U.S. PATENT DOCUMENTS

| | | | |
|---|---|---|---|
| 3,971,002 | 7/1976 | Bricat et al. ............................. | 369/109 |
| 4,581,728 | 4/1986 | Nakamura et al. ................... | 369/44.37 |
| 5,003,528 | 3/1991 | Motes et al. ............................ | 369/110 |
| 5,093,822 | 3/1992 | Kugiya et al. .......................... | 369/100 |

Primary Examiner—Andrew L. Sniezek
Assistant Examiner—Thang V. Tran
Attorney, Agent, or Firm—Kane, Dalsimer, Sullivan, Kurucz, Levy, Eisele and Richard

[57] ABSTRACT

A method of optically reproducing information from an optical recording medium on which concave or convex signal pits are formed, is provided with the steps of: irradiating each of pit edge portions of one signal pit which are opposed to each other, with a reading light respectively; detecting a reflection light from each of pit edge portions, separately, to output two detection signals indicating detected positions of the pit edge portions with respect to one signal pit; and reproducing one information recorded in one signal pit on the basis of the two detection signals.

24 Claims, 8 Drawing Sheets

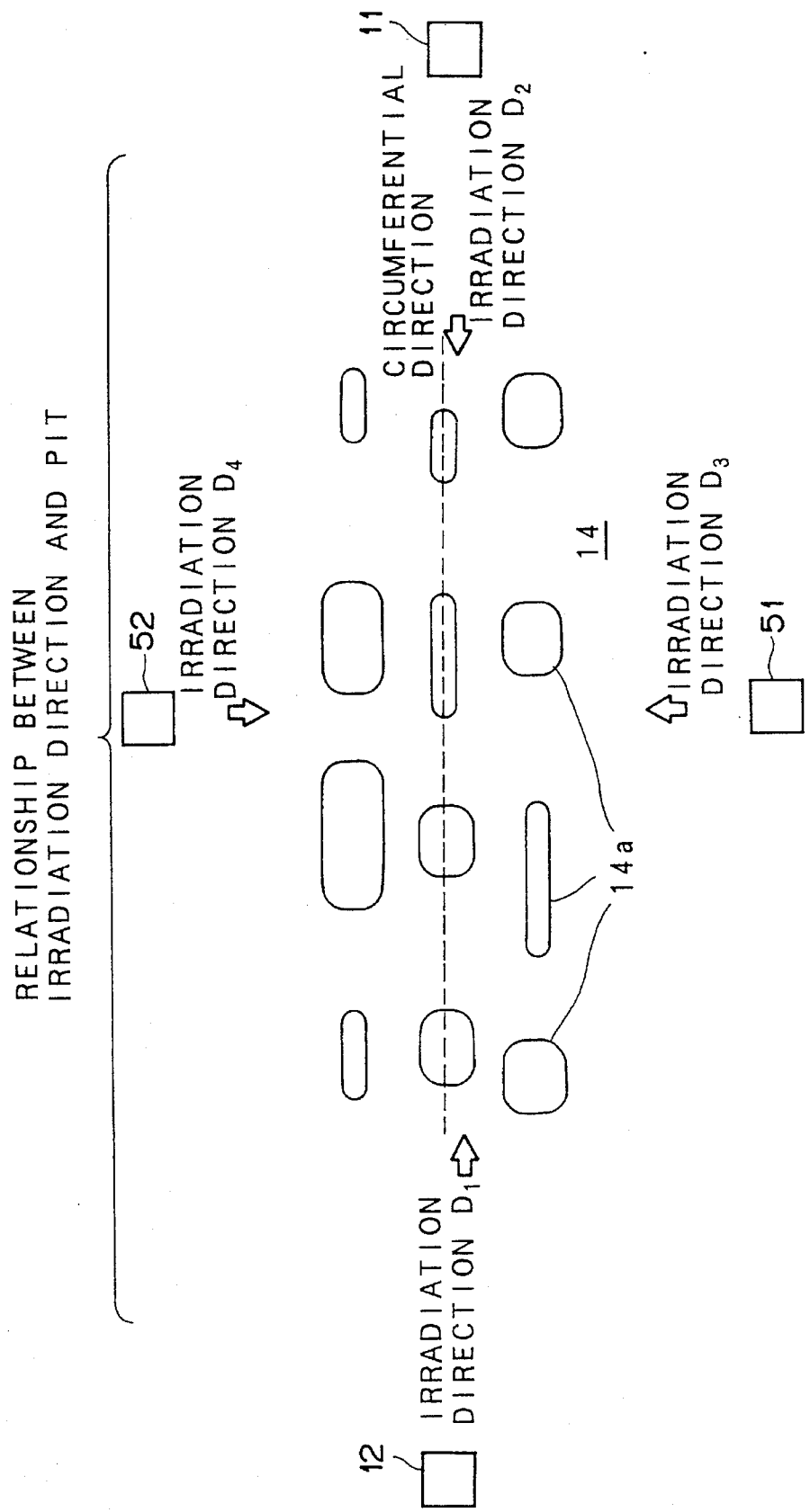

METHOD OF OPTICALLY READING INFORMATION, OPTICAL PICKUP APPARATUS AND OPTICAL REPRODUCING APPARATUS

BACKGROUND OF THE INVENTION

1. Field of the Invention

The present invention generally relates to a method of and an apparatus for optically reading information from an optical recording medium, such as an optical disc for recording video image information, audio sound information and so on, and reproducing the record information, and more particularly to a method of and an apparatus for optically reading information from an optical recording medium which information recording density is improved to be high.

2. Description of the Related Art

It is desired to read a large volume of information within a short time period from an optical recording medium such as an optical disc, as the volume of the information to be read out therefrom is increased in a great degree. Further, in case of recording and reading a HDTV (High Definition Television) signal, it is required to record and reproduce a signal of high frequency. Namely, it is required to realize the wideband of the signal.

In order to increase the volume of the record information and cope with the wideband, it may be tried to record a signal to the optical disc by a higher information recording density. Namely, by increasing the number of the convex or concave portions (called a signal pit, hereinafter) including the information which is recorded to each unit length of the signal pit, the recordable information volume can be increased. Further, by making one piece of the signal pit smaller, the wideband recording is improved, and the number of the signal pits to be read in each unit time is increased in order to reproduce the signal pits recorded by the high density.

An optical reproducing apparatus including an optical pickup to read the information recorded in this kind of signal pits of the optical disc, may be provided with: a semiconductor laser of lateral single mode, which is provided with a point light source having a light emitting point with about 0.1 µm diameter; a beam splitter for separating an irradiation light onto an optical disc from a reflection light from the optical disc; an objective lens for focusing the irradiation light from the semiconductor laser onto the optical disc; and a photodetector such as a pin photodiode for detecting the reflection light. Here, the wavelength $\lambda$ of the semiconductor laser and the numerical aperture NA of the objective lens are selected such that the relationship "$\lambda/NA > 0.1$ µm" is fulfilled, so that the spot size of the semiconductor laser on the optical disc is determined by the so-called diffraction limit, and that the diameter becomes 1.22 $\lambda/NA$.

Each of the signal pits on the optical disc is formed in the convex or concave shape, and the signal pits are arranged in a line (called a signal track hereinafter) along a circumferential direction of the optical disc and in a spiral shape as a whole, so that one signal track is formed on the optical disc. The information is recorded such that the change in the length of one signal pit in the circumferential direction corresponds to the change in the modulation of the signal to be recorded.

This kind of optical disc is provided with a protection layer, a reflection film and a transparent resin substrate, wherein the signal pits are formed with the reflection film between the protection layer and the transparent resin substrate. In this case, the reading light from the semiconductor laser is irradiated onto the signal pits through the transparent resin substrate, and by reading the length of each signal pit in the disc rotating direction i.e. the circumferential direction of the optical disc, the information recorded on the optical disc can be reproduced.

The operation of this kind of optical disc is explained here.

The reading light e.g. the laser beam is emitted from the semiconductor laser, is deflected by the beam splitter, and is irradiated onto the signal pits of the optical disc while it is focused by the objective lens. When the laser beam spot is incident to the signal pit and is diffracted by the signal pit, the diffraction amount is varied by the size of the signal pit. By this variation in the diffraction amount, the intensity of the reflection light which is reflected toward the objective lens is also varied. In this manner, the reading light irradiated onto the signal pit is modulated by the form or size of the signal pit. The reflection light which is modulated in this way, is detected by the photodetector through the objective lens and the beam splitter, so that the information recorded on the optical disc can be read.

Further, an astigmatism is given to the reflection light form the optical disc, at the time of passing through the beam splitter. By this astigmatism, there is generated a difference between the light focusing position in the longitudinal direction of the light beam and the light focusing position in the lateral direction of the light beam. The photodetector is disposed at the middle position of those two focusing positions to receive the reflection light in an optimum condition.

In the optical pickup apparatus having the above explained construction, if it is tried to read the information of the optical disc which information recording density is made high by shortening the length of each pit and the interval of the adjacent pits, since the size and the interval of the pits are so small that the spatial frequency of the signal pits exceeds the so-called optical cut-off frequency (which is proportional to the value of NA/$\lambda$). Accordingly, it becomes impossible to read the information.

Therefore, it becomes necessary to increase the reproduction spatial frequency of the optical pickup by increasing the optical cut-off frequency. In order to achieve this, the wavelength of the reading light emitted from the light source should be shortened, or the numerical aperture of the objective lens should be increased.

However, in order to shorten the wavelength of the light from the light source, in place of the presently available semiconductor laser, a gas laser or a laser using a non-linear optical element etc., should be employed, resulting in the increase of the cost and the increase of the size of the apparatus, which is a serious problem in a practical sense.

On the other hand, in order to increase the numerical aperture of the objective lens, the objective lens becomes so large that the production of the optical pickup may become very difficult. Further, when the shape of the light spot on the optical disc is greatly changed due to the inclination of the optical disc or the non-uniformity of the surface of the optical disc, such a phenomenon occurs that the signal pits around the signal pit to be detected are also detected. Thus, the production of the objective lens to overcome this phenomenon may be even more difficult.

SUMMARY OF THE INVENTION

It is therefore an object of the present invention to provide a method of optically reading information, an optical pickup apparatus and an optical reproducing apparatus, capable of reading a signal pit of an optical recording medium which information recording density is high.

The above object of the present invention can be achieved by a method of optically reproducing information from an optical recording medium on which concave or convex signal pits are formed. The method is provided with the steps of: irradiating each of pit edge portions of one signal pit which are opposed to each other, with a reading light respectively; detecting a reflection light from each of pit edge portions, separately, to output two detection signals indicating detected positions of the pit edge portions with respect to one signal pit; and reproducing one information recorded in one signal pit on the basis of the two detection signals.

According to the method of the present invention, each of pit edge portions of one signal pit is irradiated with the reading light respectively. The reflection light from each of pit edge portions, is detected separately, and two detection signals indicating detected positions of the pit edge portions are outputted. Then, one information recorded in one signal pit is reproduced on the basis of the two detection signals. Consequently, as long as a first pit edge portion of a first signal pit is spaced from a first pit edge portion (which is irradiated together with the first pit edge portion of the first signal pit) of a second signal pit (which is adjacent to the first signal pit) by an interval larger than the resolution of the reading light and the light detecting device such as a photoelectric convertor, the first pit edge portions of the first and second signal pits can be detected by the detecting device. In the same manner, the second pit edge portions (which are irradiated together) of the first and second signal pits can be detected by the light detecting device, separately from the first pit edge portions of the first and second signal pits.

Then, on the basis of those two detection signals, which have been separately detected and yet which are related to one signal pit, one information signal as for one signal pit can be reproduced.

In this manner, even if the size of the pit i.e. the interval of two pit edge portions of one signal pit is smaller than the resolution of the reading light and the light detecting device and thus the signal pit cannot be directly detected by the light detecting device, the indirect detection of the signal pit can be accomplished according to the present invention.

Consequently, the information of the optical recording medium to which information is recorded with high recording density by reducing the size of the signal pit and the interval or pitch of the signal pits, can be reproduced by the reproducing method of the present invention.

In one aspect of the present invention, the reproducing step includes the step of calculating a length between the pit edge portions of one signal pit as one information on the basis of the two detection signals. In this manner, the length of the signal pit can be indirectly detected by the reproducing method of the present invention.

In another aspect of the present invention, the irradiating step includes the step of switching over the reading light from one signal pit edge portion to another pit edge portion of one pit, and the reproducing step includes the step of switching over the two detection signals in correspondence with the switching step of the reading light. In this case, it is preferable to switch over the reading light by a speed much higher than a movement speed of the signal pits relative to an irradiated position of the reading light. Alternatively, it is preferable that, in the irradiating step, a signal track including one signal pit is traced by a plurality of times by the reading light, and in the reproducing step, the two detection signals are stored separately in a memory and one information is reproduced on the basis of the two detection signals stored in the memory.

In another aspect of the present invention, it is preferable that, in the irradiating step, the reading light is irradiated in an oblique direction with respect to a surface of the optical recording medium. In this case, only one edge portion of one signal pit can be easily detected.

The above object of the present invention can be also achieved by an optical pickup apparatus for optically reading information from an optical recording medium on which concave or convex signal pits are formed. The optical pickup apparatus is provided with: a light source device for irradiating each of pit edge portions of one signal pit which are opposed to each other, with a reading light respectively; and a light detecting device for detecting a reflection light from each of pit edge portions, separately, to output two detection signals indicating detected positions of the pit edge portions with respect to one signal pit.

Thus, the aforementioned reproducing method of the present invention can be carried out by the optical pickup apparatus of the present invention, and the aforementioned advantageous effect of the present invention can be also achieved in the same manner by the optical pickup apparatus of the present invention.

The above object of the present invention can be also achieved by an optical reproducing apparatus for optically reproducing information from an optical recording medium on which concave or convex signal pits are formed. The optical reproducing apparatus is provided with: a light source device for irradiating each of pit edge portions of one signal pit which are opposed to each other, with a reading light respectively; a light detecting device for detecting a reflection light from each of pit edge portions, separately, to output two detection signals indicating detected positions of the pit edge portions with respect to one signal pit; and a signal reproducing device for reproducing one information recorded in one signal pit on the basis of the two detection signals.

Thus, the aforementioned reproducing method of the present invention can be carried out by the optical reproducing apparatus of the present invention, and the aforementioned advantageous effect of the present invention can be also achieved in the same manner by the optical reproducing apparatus of the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 8 is a diagram showing the relationship between irradiation directions and signal pits in a third embodiment of the present invention.

DETAILED DESCRIPTION OF THE PREFERRED EMBODIMENTS

Referring to the accompanying drawings, embodiments of the present invention will be now explained.

Principle of the Invention

Prior to the explanation of concrete embodiments of the present invention, the principle of the present invention is explained here.

In an optical reproducing method of the present invention, a reading light is respectively irradiated to each of one set of side wall portions, as examples of pit edge portions, which belong to one convex or concave shaped signal pit formed on an optical recording medium such as a CD (Compact Disc) and a LVD (Laser Vision Disc). Each irradiated reading light becomes a reflection light by being scattered at the corresponding one of the pit edge portions of one pit. These reflection lights are separately detected, and converted into the electric signals respectively. Finally, these electric signals are combined into one signal representing the form or size of the signal pit, which is relevant to the irradiated pit edge portions.

In order to carry out this method, there is an optical pickup apparatus, which is provided with: a light source for respectively irradiating, with a reading light, each of the pit edge portions of one convex or concave shaped signal pit formed on the recording medium; and a photo-electric convertor for converting the reflection lights of the reading lights from the pit edge portions of one signal pit separately to electric signals respectively. The optical pickup apparatus reproduces the information included in the signal pit relevant to the irradiated pit edge portions in one set, from the electric signals of this photo-electric convertor, so that it can perform the reproduction of the information included in the signal pits recorded by the high recording density.

Hereinbelow, the concrete embodiments in which this optical pickup apparatus is applied to the optical reproducing apparatus, will be explained.

First Embodiment

In a first embodiment, two reading lights are irradiated to one signal pit from right and left oblique directions toward two pit edge portions of the signal pit, respectively. The reflection lights are detected respectively, and are combined to reproduce the recorded information as the length of the signal pit. This feature is contrary to the conventional reproducing method in which the reading light is perpendicularly irradiated onto the signal pit.

Figure 1:
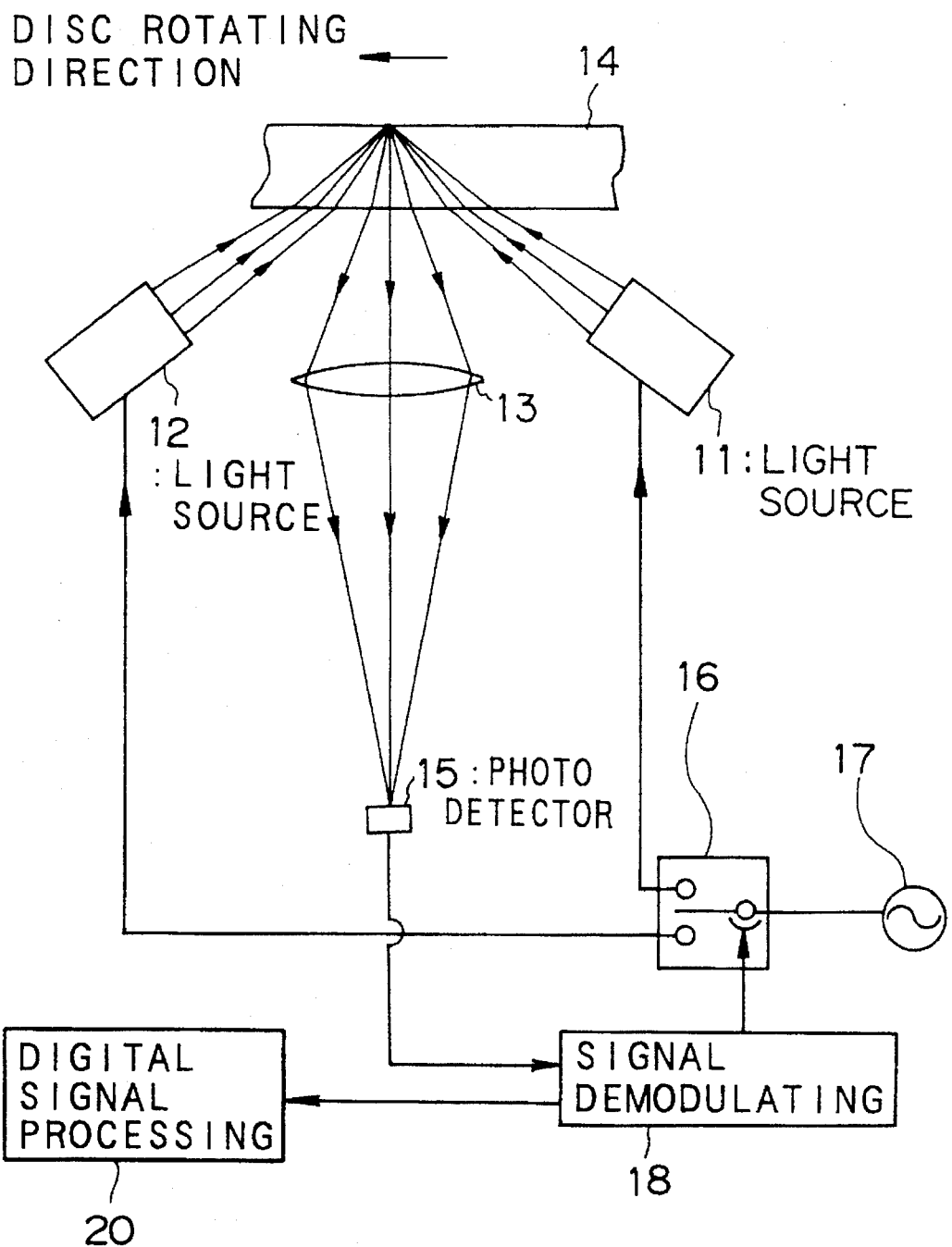
FIG. 1 is a block diagram of an optical reproducing apparatus as a first embodiment of the present invention.

In FIG. 1, an optical reproducing apparatus as the first embodiment is provided with: a light source 11 for obliquely irradiating, with a reading light, a signal pit of an optical disc 14 in an oblique direction (which is a direction from the right lower side to the left upper side in the figure) with respect to the signal pit such that it is inclined from the perpendicular direction toward the direction of modulating the signal i.e. the disc rotating direction; a light source 12 for irradiating, with a reading light, the signal pit in an oblique direction (which is a direction from the left lower side to the right upper side in the figure) which is opposed to that of the light source 11; an objective lens 13 for collecting the reflection lights from the signal pit irradiated by the light sources 11 and 12; a photodetector 15 for photo-electrically converting the reflection lights which have been modulated by the signal pit and collected by the objective lens 13; a light source switching unit 16 for switching the irradiations of the light sources 11 and 12 by a switching speed corresponding a speed on the optical disc 14 higher than the signal pit proceeding speed; a light source driver 17 for supplying the electric power to the light sources 11 and 12 through a light source switching unit 16; a signal demodulating unit 18 for generating and outputting a light source switching control signal to the light source switching unit 16, switching the output of the photodetector 15 on the basis of the light source switching control signal, demodulating the information included in the signal pit on the basis of the outputs from the photodetector 15, and outputting the demodulation signal to a digital signal processing unit 20.

Figure 2:
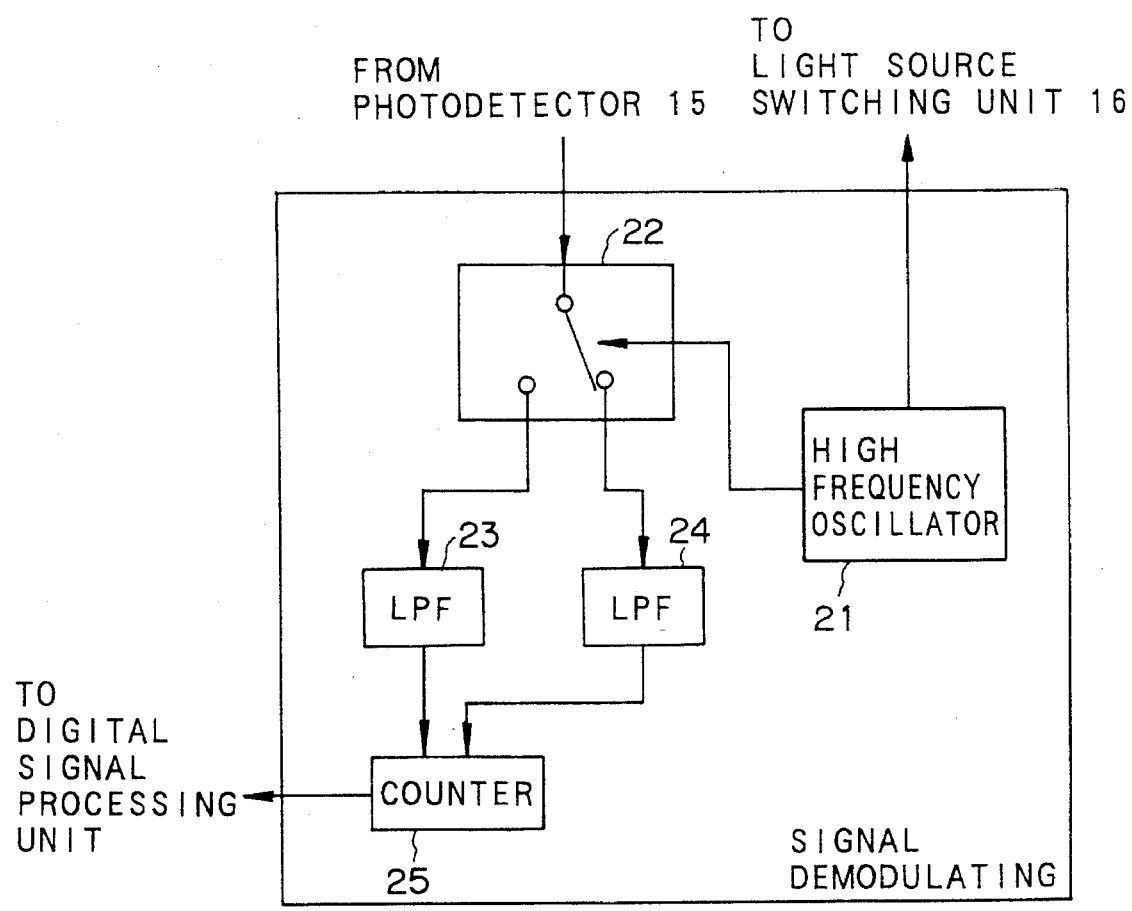
FIG. 2 is a block diagram of a signal demodulating unit of the first embodiment.

In FIG. 2, the signal demodulating unit 18 is provided with: a high frequency oscillator 21 for generating a high frequency signal as a control signal to switch over the light sources 11 and 12, and outputting it to the light source switching unit 16 and a signal switching device 22; the signal switching device 22 for switching the output of the reflection light originated by the light source 11 and the output of the reflection light originated by the light source 12, which are outputted from the photodetector 15, on the basis of the light source switching control signal generated by the high frequency oscillator 21, and outputting the switched outputs to low pass filters 23 and 24, respectively; the low pass filter 23 for cutting the high frequency component of one of the outputs, which are originated from the light sources 11 and 12, and are supplied from the signal switching device 22; the low pass filter 24 for cutting the high frequency component of another of the outputs, which are originated from the light sources 11 and 12, and are supplied from the signal switching device 22; and a counter 25 for counting the count value of the predetermined interval by use of the signal passing through the low pass filters 23 and 24 as trigger signals, and outputting the result as the demodulation signal, which indicates the length of the irradiated signal pit, to the digital signal processing unit 20 in FIG. 1.

Nextly, the operation of the thus constructed optical reproducing apparatus will be explained, with referring to FIG. 1 to FIG. 5.

The light source 11 irradiates the reading light onto the signal pit from the oblique direction (which is the direction from the right lower side to the left upper side in FIG. 1). The light source 12 irradiates the reading light onto the signal pit from the direction opposed to the light source 11 (which is the direction from the left lower side in FIG. 1). The irradiated light is scattered at the pit edge portion of the optical disc 14, so that the reflection light is formed from the irradiated light.

Figure 3:
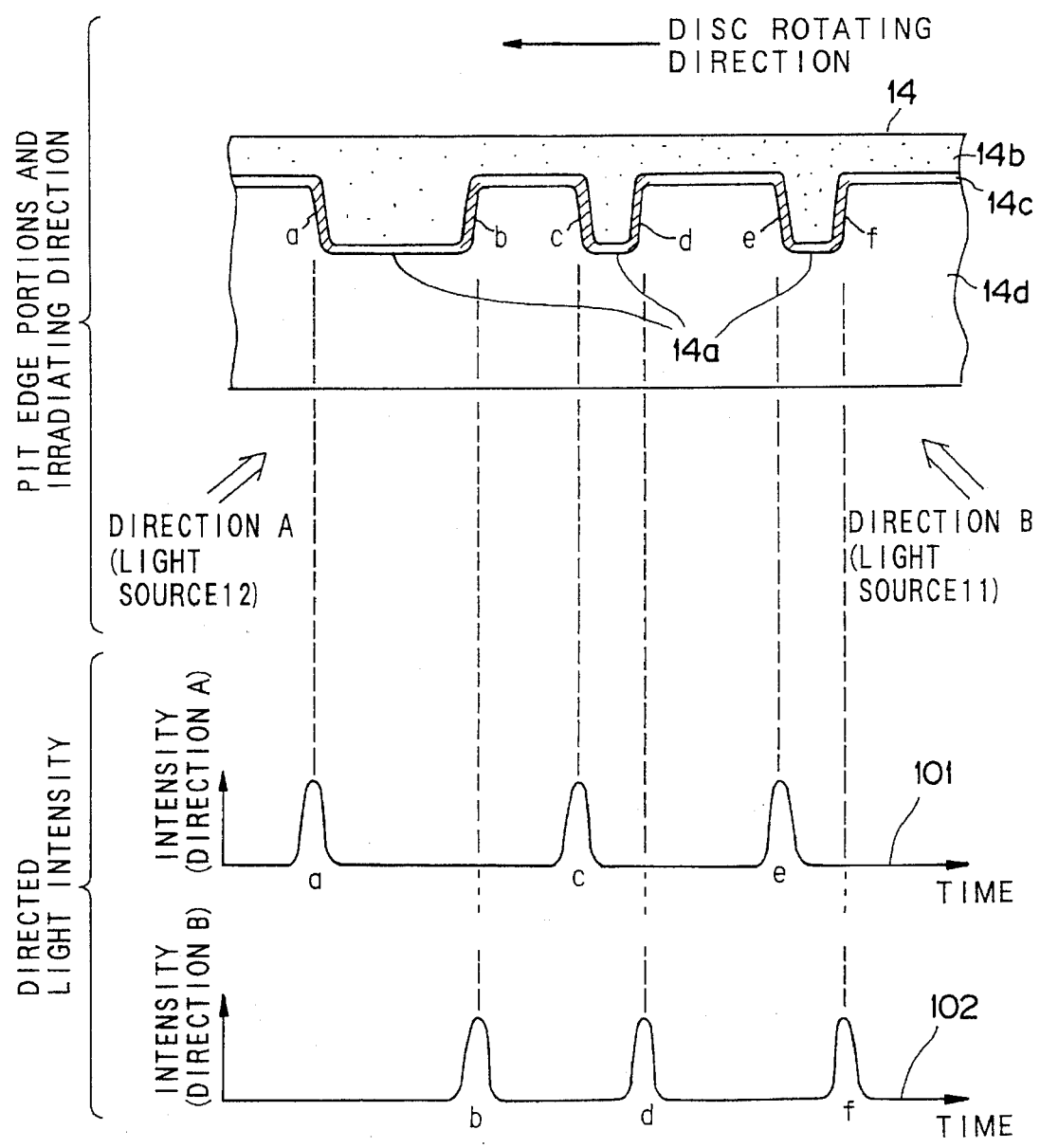
FIG. 3 is a diagram showing the relationship between irradiation directions and pit edge portions, and intensities of reflection lights in the first embodiment.

Here, the principle to obtain the reflection light as the result of the scattering of the irradiated light at the pit edge portion, is explained with referring to FIG. 3.

In FIG. 3, the optical disc 14 includes a plurality of signal pits 14a, each of which has a convex shape. The optical disc 14 is also provided with: a protection layer 14b; a reflection film 14c; and a transparent resin layer 14d. FIG. 3 shows such a case that the reading light is irradiated to the signal pits 14a, in a direction A from the left lower side (by the light source 12), and the reading light is irradiated to the signal pits 14a in a direction B from the right lower side (by the light source 11). Here, the reading light irradiated from the direction A, is scattered by the pit edge portions a, c, and e (which are indicated by hatched areas) respectively, and the respective reflection lights are obtained. Further, since the optical disc 14 is rotated in the disc rotating direction, the relationship between the intensities of the reflection lights of those pit edge portions a, c and e, and the time is obtained as indicated by a chart line 101 in FIG. 3. In the same manner, the reading lights irradiated from the direction B, are scattered by the pit edge portions b, d and f (which are indicated by hatched areas), and the relationship between the light intensities of the reflection lights of those pit edge portions b, d and f, and the time is obtained as indicated by a chart line 102 in FIG. 3.

The present embodiment is constructed such that the reflection lights having the intensities as indicated by the chart lines 101 and 102 in FIG. 3, are respectively detected, and are combined after the detections, so that the information is reproduced as the length between the time a and the time b, the length between the time c and the time d, and the length between the time e and the time f. Namely, the length of each signal pit is calculated, and the information is reproduced as the length information.

Nextly, the reflection light obtained by the scattering at the pit edge portion, is detected by the photodetector 15, is photo-electrically converted and is outputted to the signal demodulating unit 18. The signal outputted to the signal demodulating unit 18 is converted to the information indicating the length of the signal pit by the signal demodulating unit 18, and is outputted to the digital signal processing unit 20, where it is converted into the audio sound signal and the video image signal.

Figure 4:
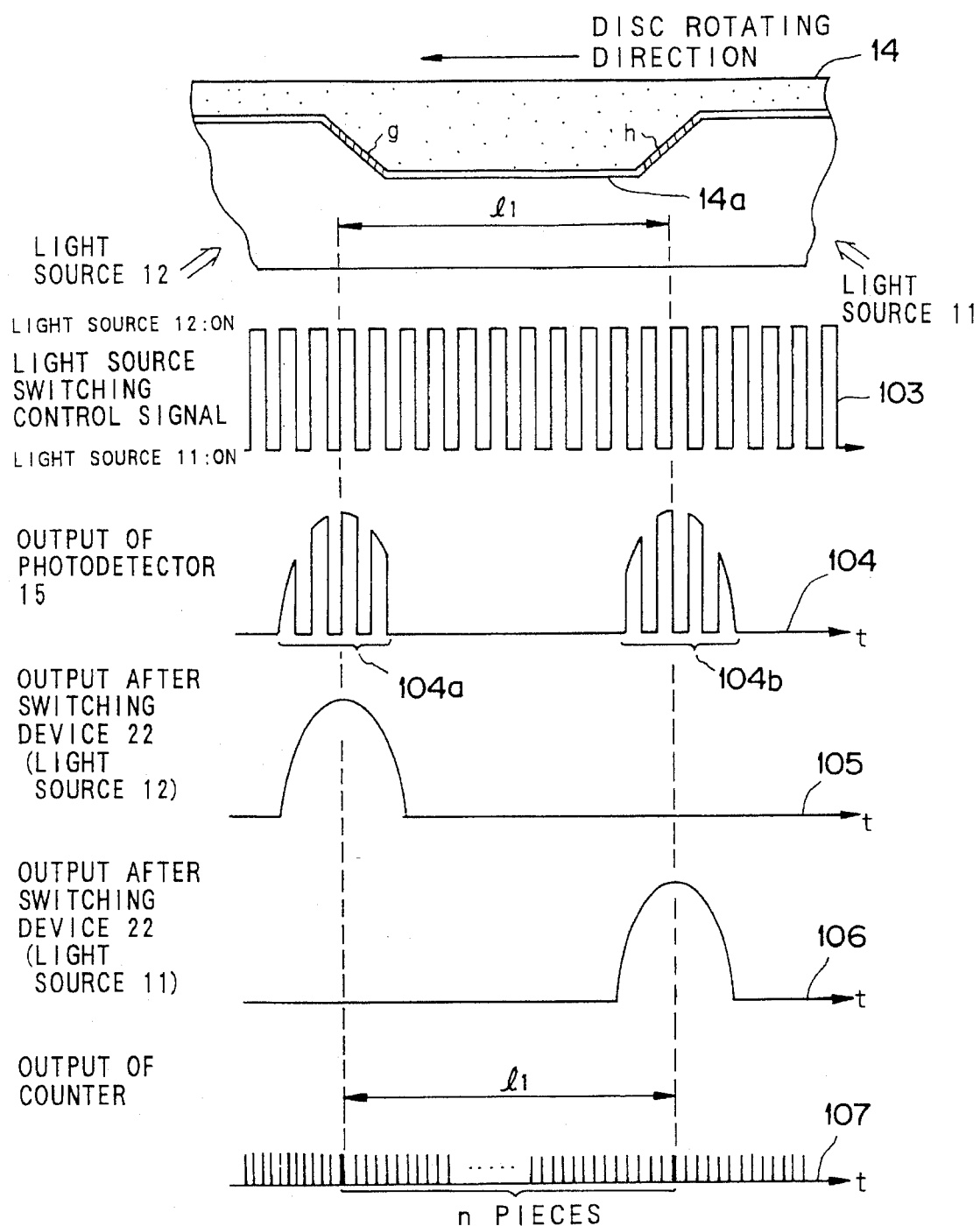
FIG. 4 is a timing chart in a case where the light source is switched by a frequency higher than a signal frequency in the first embodiment.

The signal demodulating method in the signal demodulating unit 18 is explained here with referring to FIG. 4.

Firstly, the irradiating method of the light sources 11 and 12, are explained. While the light sources 11 and 12 irradiate the reading lights onto the pit edge portions of the optical disc 14, the light sources 11 and 12 are switched over by a time interval which is much shorter than the time interval which is required for the signal pit to pass through the irradiation position of the light source (the light sources 11 and 12 are positioned such that the irradiation positions are approximately the same to each other), on the basis of the light source switching control signal generated by the high frequency oscillator 21 in the signal demodulating unit 18. Namely, while the signal pit is passing through those two irradiation positions of the light sources, the light sources 11 and 12 are switched over by a high speed, so that one signal pit is alternatively irradiated by those switched light sources 11 and 12, and that the reflection lights from the respective pit edge portions are alternatively obtained.

The above explained operations are further explained by use of FIG. 4. While one signal pit 14a shown in FIG. 4, is moved from the right to the left along with the rotation of the optical disc 14, the light sources 11 and 12 irradiate the pit edge portions while being switched over by a much higher speed than the moving speed of the signal pit, on the basis of the light source switching control signal as indicated by a chart line 103 in FIG. 4. The relationship between the output of the photodetector, due to the reflection lights obtained by the irradiations, and the time, is indicated by a chart line 104. The chart line 104 shows that the output corresponding to the pit edge portion g (which is indicated by a hatched area in the figure) irradiated by the light source 12, is obtained at first as indicated by a portion 104a. Then, the output corresponding to the pit edge portion h (which is indicated by a hatched area in the figure) irradiated by the light source 11 is obtained when the time corresponding to the length $l_1$ of the signal pit 14a has elapsed as indicated by a portion 104b. Each of the output signals has a saw teeth waveform since the light sources 11 and 12 are switched over by a high speed. In the output indicated by the chart line 104, the phase of the output of the reflection light due to the irradiation by the light source 11 and that of the reflection light due to the irradiation by the light source 12 are reverse to each other.

The output having the saw teeth waveform of the photodetector 15, is inputted to the signal switching device 22 of the signal demodulating unit 18. In the signal switching device 22, the output of the photodetector 15 is switched in synchronization with the switching cycle of the light sources 11 and 12, on the basis of the light source switching control signal generated by the high frequency oscillator 21. By this, the output of the photodetector 15 due to the reflection light originated from the light source 11 and the output of the photodetector 15 due to the reflection light originated from the light source 12, are separated from each other, and the respective outputs are separately outputted to the low pass filters 23 and 24. In the low pass filters 23 and 24, the high frequency components of the respective outputs are cut, so that the waveforms indicated by a chart line 105 and a chart line 106 respectively, are formed and outputted to the counter 25. In the counter 25, each output of the low pass filters 23 and 24, is used as a trigger signal, and a counting operation is performed by a predetermined cycle. Then, the counting result n (as indicated by a chart line 107 of FIG. 4), is outputted to the digital signal processing unit 20, as the information indicating the length $l_1$ of the signal pit 14a.

By the above explained operations, the reflection light of the pit edge portion is converted to the signal indicating the length of the signal pit, and is outputted to the digital signal processing unit 20.

As described above, according the present embodiment, the pit edge portions are irradiated from the oblique direction with respect to the signal pit, and are detected. By converting the detection result to the information indicating the length of the signal pit, the information of the optical disc, which information recording density is higher than the conventional optical discs, can be detected by use of the photodetector having the conventional resolution, and it can be reproduced as the information.

Figure 5:
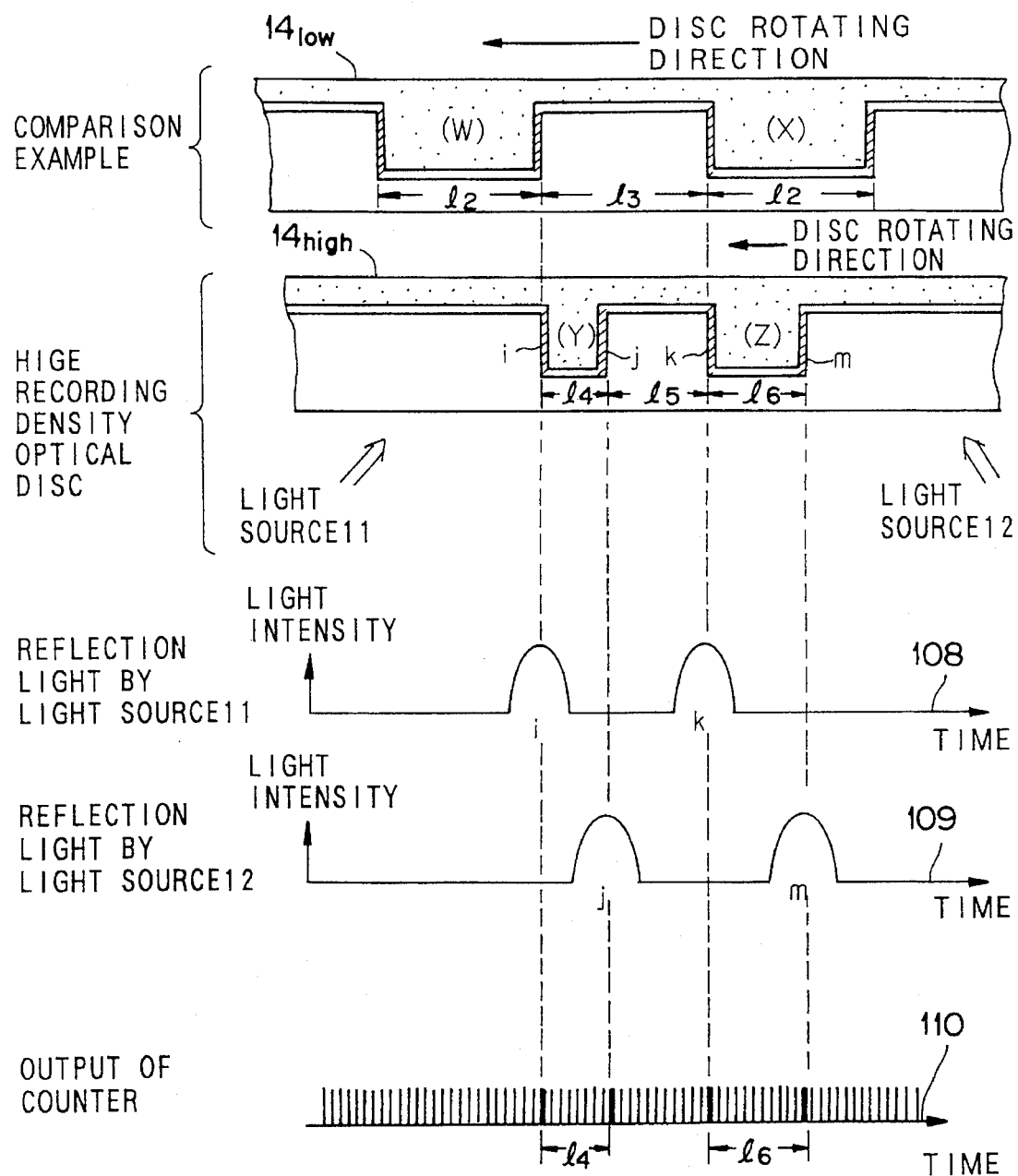
FIG. 5 is a timing chart of detecting information of an optical disc recorded by high information recording density in the first embodiment.

This effect is explained in more detail with referring to FIG. 5.

In FIG. 5, an optical disc $14_{low}$ is a low information recording density type (e.g. conventional type) as a comparison example, and is provided with signal pits W and X, each of which has a length $l_2$ and which are arranged with an interval $l_3$. An optical disc $14_{high}$ is a high information recording density type, which can be reproduced by the present embodiment, and is provided with a signal pit Y, which has a length $l_4$, and a signal pit Z, which has a length $l_6$. The pits Y and Z are arranged with an interval $l_5$. In order to understand it easily, the pit edge portions are assumed to be perpendicular to the optical disc surface, and are indicated by hatched areas in FIG. 5.

By comparing the optical discs $14_{low}$ and $14_{high}$ with each other, the optical disc $14_{low}$ needs a length expressed by a following expression, in order to record 2 pieces of signal pits.

$$2 \times l_2 + l_3$$

while the optical disc $14_{high}$ only needs a length expressed by a following expression, in order to record 2 pieces of signal pits.

$$l_4 + l_5 + l_6$$

Namely, it is understood that the information recording density of the optical disc $14_{high}$ is higher than that of the optical disc $14_{low}$.

In case of detecting the signal pits Y and Z of the optical disc $14_{high}$ of high recording density type by a photodetector having a resolution according to a conventional art (which is just enough to detect the signal pits W and X of the optical disc $14_{low}$), if the reading light is irradiated from the direction perpendicular to the signal pit as in the conventional cases, the two signal pits Y and Z cannot be distinguished or detected as two pits, since the size of those signal pits Y and Z are less than the resolution of the photodetector.

On the contrary, according to the method of detecting the signal pit of the present invention, while the pit edge portions i, j, k and m are irradiated, since the pit edge portions i and k are spaced from each other by a distance distinguishable by the photodetector having the conventional resolution, and since the pit edge portions j and m are spaced from each other by a distance distinguishable by the photodetector having the conventional resolution, the outputs indicated by chart lines 108 and 109 can be obtained respectively, by use of the photodetector having the conventional resolution. Since the thus outputted results are converted by the counter 25 to the length of the signal pit and outputted as indicated by a chart line 110, the signal pits Y and Z of the optical disc $14_{high}$ of the high recording density type, can be detected by the photodetector of the conventional type, according to the present embodiment.

Second Embodiment

A second embodiment will be explained with referring to FIGS. 6 and 7.

The second embodiment is the same as the first embodiment in that the pit edge portion of the optical disc is irradiated from the oblique direction to detect it, and is different from the first embodiment in that the light sources are not switched over by the high speed but the rotational speed of the optical disc is made high and the same track is traced by a plurality of times. Further, the second embodiment is characterized in that the light sources are switched over each time when one trace is completed, and the counting result per one trace is stored, and one signal is composed after tracing one signal track twice to obtain the detection results of both light sources.

The construction of the present invention will be explained hereinbelow, with referring to FIG. 6. In FIG. 6, the same constitutional elements as those in FIG. 1 carry the same reference numerals, and the detailed explanation thereof are omitted.

Figure 6:
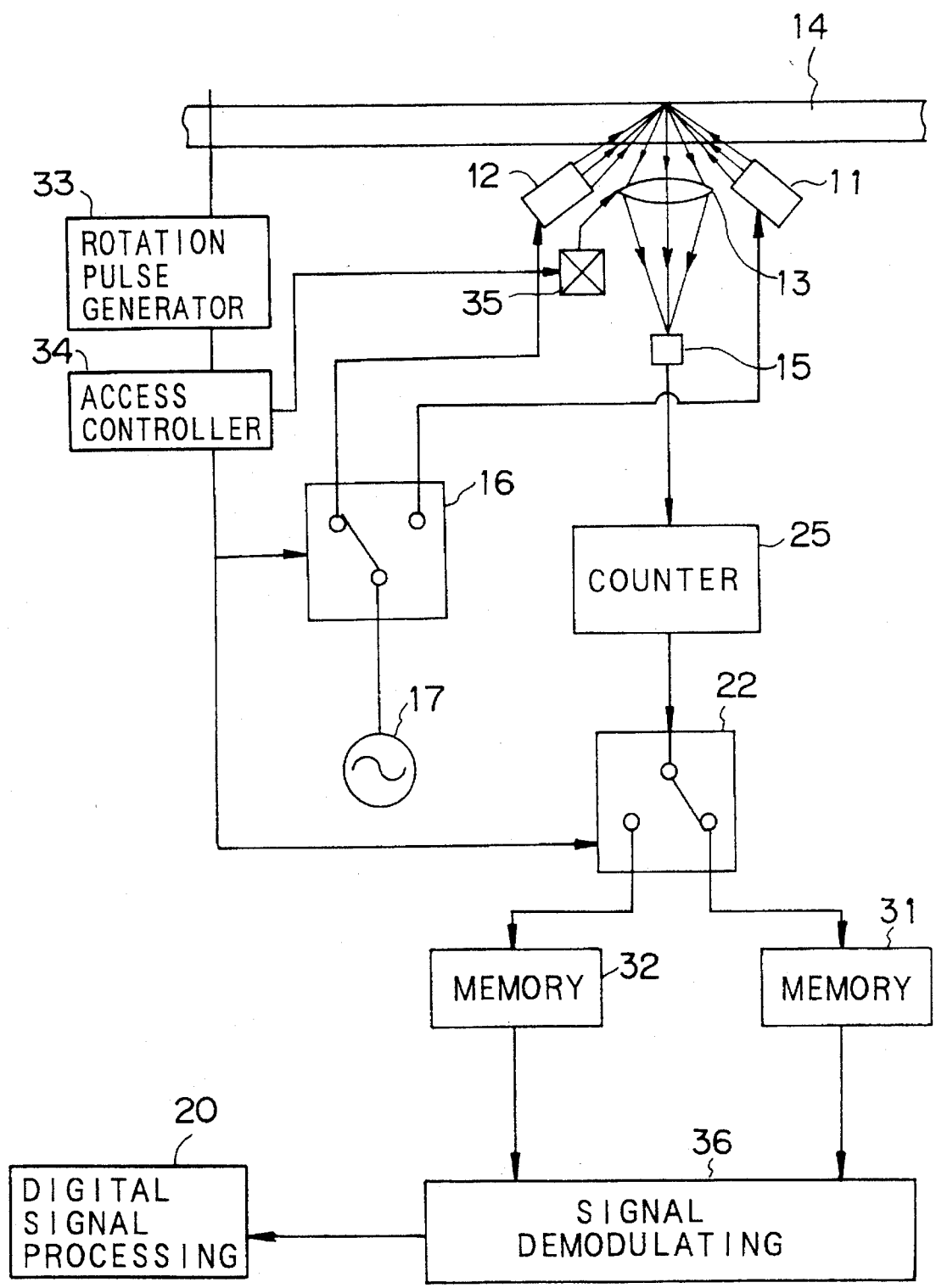
FIG. 6 is a block diagram of an optical reproducing apparatus as a second embodiment of the present invention.

In FIG. 6, an optical reproducing apparatus as the second embodiment is provided with: a light source 11 for irradiating a signal pit of an optical disc 14 from the oblique direction which is inclined to the direction parallel to the signal modulated direction of the optical disc (which is the direction from the right lower side in the figure); a light source 12 for irradiating the signal pit of the optical disc 14 from the oblique direction which is inclined to the direction parallel to the signal modulated direction of the optical disc 14 and which is opposed to the direction of the light source 11 (which is the direction from the left lower side in the figure); an objective lens 13 for collecting the reflection lights from the signal pit irradiated by the light sources 11 and 12; a photodetector 15 for photo-electrically converting the reflection light, which is modulated and reflected by the signal pit, and which is collected by the objective lens 13; a counter 25 for counting a counting value by a predetermined interval by using the output of the photodetector 15 as the trigger signal; a light source switching unit 16 for switching the irradiation condition of the light sources 11 and 12; a light source driver 17 for supplying electric power to the light sources 11 and 12 via the light source switching unit 16; a rotation pulse generator 33 for generating a rotation pulse per one rotation of the optical disc 14; an access controller 34 for generating a light source switching control signal to output it to the light source switching unit 16 and a signal switching device 22, and generating an objective lens driving control signal to output it to an objective lens driving controller 35; the objective lens driving controller 35 for driving to move the objective lens so as to obtain the optimum trace condition on the basis of the objective lens driving control signal from the access controller 34; a signal switching device 22 for switching the output of the counter 25 in synchronization with the switching cycle of the light sources 11 and 12 on the basis of the light source switching control signal from the access controller 34, and separating the detection result of the reflection light due to the irradiation by the light source 11 and the detection result of the reflection light due to the irradiation by the light source 12, from each other; memories 31 and 32 for storing the outputs respectively, which are separated by the signal switching device 22; and a signal demodulating unit 36 for combining the counting result outputted from the memories 31 and 32, and converting it to a signal indicating the length of the signal pit, to output it to the digital signal processing unit 20.

Nextly, the operation of the thus constructed second embodiment will be explained hereinbelow with referring to FIGS. 6 and 7.

The reading lights are irradiated onto the pit edge portions by the light sources 11 and 12, the reflection lights are obtained by the scattering at the pit edge portions, the reflection lights are photo-electrically converted by the photodetector 15, and the detection signals are obtained in the same manner as in the first embodiment.

However, the second embodiment is different from the first embodiment in that, instead of switching over the light sources 11 and 12 by a much higher speed relative to the signal pit progressing speed, the switching operation is performed each time when the optical disc is rotated by one rotation.

In the counter 25, the interval of the pit edge portion detected by the photodetector 15 is counted by use of the output of the photodetector 15 as the trigger signal, and the counting result is outputted to the signal switching device 22.

In the signal switching device 22, the output signal of the counter 25 is switched over in synchronization with the switching cycle of the light sources 11 and 12 on the basis of the light source switching control signal from the access controller 34, so that the detection result originated from the light source 11 and the detection result originated from the light source 12 are separated.

In the memories 31 and 32, the counting results separated by the signal switching device 22 are stored respectively per signal track.

Figure 7:
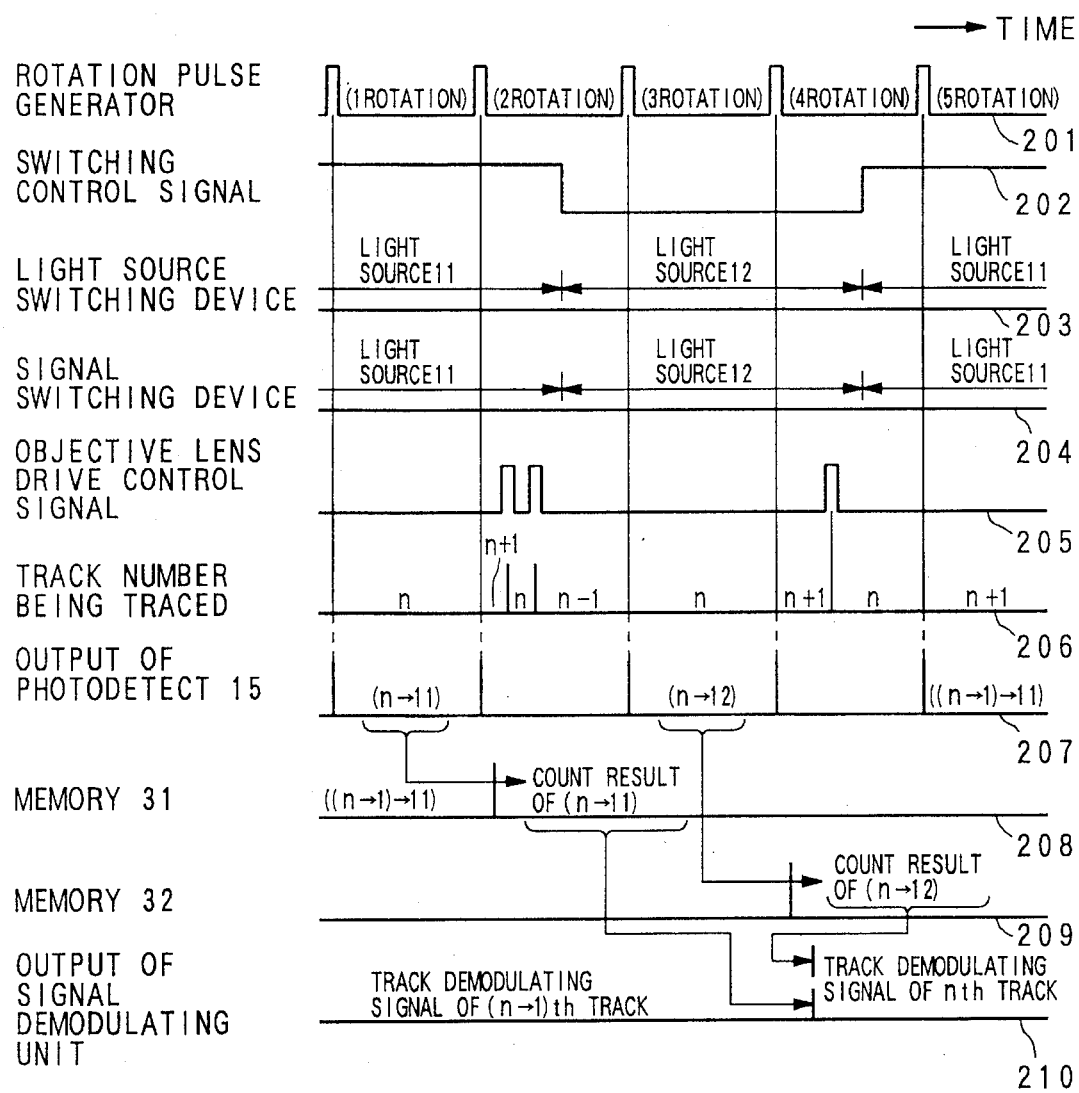
FIG. 7 is a timing chart of each output in the second embodiment.

Here, the relationship between the trace of the signal track, the pit edge portions and the demodulation of the detected signals in the present embodiment, is explained with referring to a timing chart of FIG. 7.

In FIG. 7, it is assumed that the counting result of the pit edge portion due to the irradiation of the light source 11, is stored into the memory 31, and that the counting result of the pit edge portion due to the irradiation of the light source 12, is stored into the memory 32.

In FIG. 7, an expression of "(X→Y)" represents the result of irradiation onto the xth signal track by the light source Y. For example, an expression of "(n→11)" represents the result of irradiation onto the nth signal track by the light source 11.

Here, it is also assumed that the optical disc is rotated by a speed 4 times as high as the ordinary speed. The rotation pulse generator 33 generates the pulse per one rotation of the optical disc 14 (as indicated by a chart line 201 in FIG. 7). On the basis of this pulse, the access controller 34 outputs the light source switching control signal (as indicated by a chart line 202) to the light source switching unit 16 and the signal switching device 22, with a shift of half cycle per 2 rotations of the optical disc as indicated by the chart line 202.

The light source switching unit 16, switches over the light sources 11 and 12 on the basis of the light source switching control signal (as indicated by a chart line 203). In FIG. 7, it is shown that, at the first rotation of the optical disc 14, it is irradiated by the light source 11.

At the same time, in the signal switching device 22, on the basis of the light source switching control signal, the counting result of the pit edge portion due to the irradiation of the light source 11 and the counting result of the pit edge portion due to the irradiation of the light source 12 are switched over (as indicated by a chart line 204). In FIG. 7, it is shown that the counting result is outputted as for the pit edge portion due to the irradiation of the light source 11 at the first rotation of the optical disc.

In the light source switching unit 16 and the signal switching device 22, it is repeated hereinafter in the same manner, that the light sources 11 and 12, and the respective outputs are switched over each time when the light source switching control signal is inputted from the access controller 34.

Further, the access controller 34 outputs the objective lens driving control signal for driving to move the objective lens so as to obtain the optimum trace condition with respect to the objective lens driving control unit 35 (as indicated by a chart line 105). In FIG. 7, after completing one rotation of the optical disc 14, the objective lens driving control signal to order the signal track movement (track jump) twice is outputted during the time period before the light source switching control signal is outputted from the access controller 34. By this signal, at the first rotation of the optical disc, the nth signal track, for example, is traced, and the objective lens 13, which has been tracing the (n+1)the signal track at the second rotation of the optical disc, starts tracing the (n−1)the signal track by performing the track jump twice (as indicated by chart line 206). During this time period, the access controller 34 outputs the light source switching control signal to the light source switching unit 16 and the signal switching device 22, so that each of the light source switching unit 16 and the signal switching device 22 is switched from the side for the light source 11 to the side for the light source 12 (as indicated by a chart line 207).

In this condition, the optical disc 14 is proceeded to be rotated. When it comes the 3rd rotation, the objective lens 13 traces the nth signal track after jumping back. Here, since the light source 11 is switched to the light source 12, the nth signal track, which has been irradiated by the light source 11 at the 1st rotation of the optical disc 14, is now irradiated by the light source 12 in turn. The output due to this reflection light is outputted to the memory 32, which stores the counting result of the pit edge portion due to the irradiation of the light source 12, through the signal switching device 22.

In the same manner, when it comes the 4th rotation of the optical disc 14, the access controller 34 outputs the next light source switching control signal, and outputs the signal to order one track jump to the objective lens driving control unit 35. By this, the objective lens 13, which has been tracing the (n+1)th signal track in the 4th rotation of the optical disc 14, starts tracing the nth signal track after jumping back. At the same time, each of the light source switching unit 16 and the signal switching device 22 is switched to the side for the light source 11.

In this condition, when it comes the 5th rotation of the optical disc 14, the objective lens 13 traces the (n+1)th signal track, and the (n+1)th track is irradiated by the light source 11. The output is outputted to the memory 31, which stores the counting result due to the light source 11, through the signal switching device 22. After that, the above explained procedures are repeated, such that the counting result of the pit edge portion due to the light source 11 and the counting result of the pit edge portion due to the light source 12 are stored into the memories 31 and 32 respectively (as indicated by chart lines 208 and 209), while the optical disc 14 rotates by 4 rotations. Since the rotation number of the optical disc 14 is the 4 times, the time delay as compared with the ordinary cases, does not occur.

Nextly, the counting results stored in the memories 31 and 32, are outputted to the signal demodulating unit 36 after completing the irradiation from both directions by the light sources 11 and 12 with respect to one signal track, and are combined to be outputted as the counting result of one signal track (as indicated by a chart line 210) to the digital signal processing unit 20.

As described above, according to the present embodiment, the pit edge portions are irradiated from the oblique directions with respect to the signal pit, are detected and combined while tracing the same signal track by a plurality of times, so that the detected signals are converted to the information indicating the length of the signal pit. Thus, the information of the optical disc, which recording density is higher than the conventional optical discs, can be detected and reproduced by use of the photodetector having the conventional resolution.

Modified Embodiments

In the above described embodiments, the information is recorded such that the change in the length of the signal pit in the circumferential direction of the optical disc corresponds to the change in the modulation rate of the signal to be reproduced. However, in the present embodiment, the information is recorded such that the change in the length of the signal pit in the radial direction of the optical disc in addition to the circumferential direction of the optical disc corresponds to the change in the modulation rate of the signal to be reproduced.

Namely, in FIG. 8, the modified embodiment is provided with, in addition to the light sources 11 and 12 irradiating from oblique directions D1 and D2 of the first or second embodiment, light sources 51 and 52 for irradiating the signal pit from oblique directions D3 and D4 respectively, which are inclined to the orthogonal direction with respect to the disc rotating direction, so that the pit edge portions are irradiated from the four directions D1, D2, D3 and D4, and that the detection of the pit edge portion, which indicates the change in the length in the circumferential direction, and the detection of the pit edge portion, which indicates the change in the length in the radial direction, are performed, as shown in FIG. 8. In this case, in the same manner as the first and second embodiments, the pit edge portion is detected by switching the light sources 11, 12, 51 and 52 by a high speed, or by tracing the same signal track more than 4 times, so that the information is reproduced therefrom.

In the above mentioned embodiments, each of the light sources for irradiating the optical disc, may consist of a semiconductor laser which irradiates a relatively narrow area of the optical disc. A light emitting diode, a halogen lamp etc. may be used as the light source, which irradiates a relatively wide area, so that one pit edge portion within the irradiated area can be detected by the detection methods described in the above embodiments.

Further, instead of one photodetector, two or more than two of the photodetectors may be employed which are arranged in an array, such that the information of a plurality of pit edge portions is simultaneously read.

In the above explanations, although the pit edge portion has been explained as the side wall portion of the signal pit, the pit edge portion may be a corner portion of the signal pit. In this case, the length between corners of one signal pit may be detected to reproduce the information. Further, the pit edge portion may be a portion including both of the side wall portion and the corner portion of the signal pit.

As described above in detail, according to the present embodiments, the optical recording medium such as an optical disc, is irradiated by a plurality of light sources in one set. The resultant reflection lights, which indicate the positions of the pit edge portions of one signal pit recorded with the information, are detected by the photoelectric convertor. Thus, as long as the interval of the pit edge portions which are adjacent to each other and simultaneously irradiated, is larger than the resolution of the reading light and the photoelectric convertor, the pit edge portions can be detected.

After that, by combining the detected signals which indicate the positions of the pit edge portions, to reproduce one signal, the signal pit, which is too small to directly detect by the resolution of the reading light and the photoelectric convertor, can be indirectly detected as one signal pit.

Consequently, by reducing the size of the signal pit and the interval between the adjacent signal pits i.e. the pitch of the signal pits, the information of the optical recording medium, which information recording density is higher than the conventional cases, can be reproduced according to the present embodiments.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A method of optically reproducing information from an optical recording medium on which concave or convex signal pits are formed, said method comprising the steps of:

irradiating each of pit edge portions of one signal pit which are opposed to each other, with a reading light respectively;

detecting a reflection light from said each of pit edge portions, separately, to output two detection signals indicating detected positions of the pit edge portions with respect to said one signal pit; and reproducing one information recorded in said one signal pit on the basis of the two detection signals.

2. A method according to claim 1, wherein said reproducing step comprises the step of calculating a length between the pit edge portions of said one signal pit as said one information on the basis of the two detection signals.

3. A method according to claim 1, wherein said irradiating step comprises the step of switching over the reading light from one pit edge portion to another pit edge portion of said one signal pit, and said reproducing step comprises the step of switching over the two detection signals in correspondence with the switching step of the reading light.

4. A method according to claim 3, wherein said reproducing step further comprises the step of counting an interval between the two detection signals.

5. A method according to claim 3, wherein, in said switching step in the irradiating step, the reading light is switched over by a speed much higher than a movement speed of the signal pits relative to an irradiated position of the reading light.

6. A method according to claim 3, wherein in said irradiating step, a signal track including said one signal pit is traced by a plurality of times by the reading light, and in said reproducing step, the two detection signals are stored separately in a memory and said one information is reproduced on the basis of the two detection signals stored in said memory.

7. A method according to claim 1, wherein, in said irradiating step, the reading light is irradiated in an oblique direction with respect to a surface of said optical recording medium.

8. An optical pickup apparatus for optically reading information from an optical recording medium on which concave or convex signal pits are formed, said apparatus comprising:

a light source means for irradiating each of pit edge portions of one signal pit which are opposed to each other, with a reading light respectively; and a light detecting means for detecting a reflection light from said each of pit edge portions, separately, to output two detection signals indicating detected positions of the pit edge portions with respect to said one signal pit.

9. An apparatus according to claim 8, wherein said light source means switches over the reading light from one pit edge portion to another pit edge portion of said one pit.

10. An apparatus according to claim 9, wherein said light source means switches over the reading light by a speed much higher than a movement speed of the signal pits relative to an irradiated position of the reading light.

11. An apparatus according to claim 8, wherein the light source means traces a signal track including said one signal pit by a plurality of times by the reading light.

12. An apparatus according to claim 11 further comprising:

an objective lens for focusing the irradiated reading light onto said one signal pit; and an objective lens moving means for moving said objective lens to maintain an optimum tracing condition to trace the signal track.

13. An apparatus according to claim 8, wherein said light source means irradiates said each of pit edge portions with the reading light in an oblique direction with respect to a surface of said optical recording medium.

14. An apparatus according to claim 8, wherein said light source means comprises a plurality of light sources for irradiating the pit edge portions respectively.

15. An apparatus according to claim 14, wherein said light source means comprises one set of light sources including: a first light source for irradiating one pit edge portion of said one signal pit from one oblique direction, which is inclined toward a direction parallel to a moving direction of said one signal pit with respect to a direction perpendicular to said optical recording medium; and a second light source for irradiating another pit edge portion of said one signal pit from another oblique direction, which is inclined toward the direction parallel to the moving direction with respect to the direction perpendicular to said optical recording medium and which is opposed to said one oblique direction.

16. An apparatus according to claim 14, wherein said light source means comprises one set of light sources including: a first light source for irradiating one pit edge portion of said one signal pit from one oblique direction, which is inclined toward a direction orthogonal to a moving direction of said one signal pit with respect to a direction perpendicular to said optical recording medium; and a second light source for irradiating another pit edge portion of said one signal pit from another oblique direction, which is inclined toward the direction orthogonal to the moving direction with respect to the direction perpendicular to said optical recording medium and which is opposed to said one oblique direction.

17. An optical reproducing apparatus for optically reproducing information from an optical recording medium on which concave or convex signal pits are formed, said apparatus comprising:

a light source means for irradiating each of pit edge portions of one signal pit which are opposed to each other, with a reading light respectively;

a light detecting means for detecting a reflection light from said each of pit edge portions, separately, to output two detection signals indicating detected positions of the pit edge portions with respect to said one signal pit; and a signal reproducing means for reproducing one information recorded in said one signal pit on the basis of the two detection signals.

18. An apparatus according to claim 17, wherein said signal reproducing means calculates a length between the pit edge portions of said one signal pit as said one information on the basis of the two detection signals.

19. An apparatus according to claim 17, wherein said light source means comprises a light source switching means for switching over the reading light from one pit edge portion to another pit edge portion of said one signal pit, and said signal reproducing means comprises a signal switching means for switching over the two detection signals in correspondence with a switching operation of the reading light.

20. An apparatus according to claim 19, wherein said signal reproducing means comprises a counter means for counting an interval between the two detection signals.

21. An apparatus according to claim 19, wherein said light source switching means switches over the reading light by a speed much higher than a movement speed of the signal pits relative to an irradiated position of the reading light.

22. An apparatus according to claim 19, wherein said light source means traces a signal track including said one signal pit by a plurality of times by the reading light, and said signal reproducing means further comprises a memory for storing the two detection signals separately, and reproduces said one information on the basis of the two detection signals stored in said memory.

23. An apparatus according to claim 22 further comprising:

an objective lens for focusing the irradiated reading light onto said one signal pit; and an objective lens moving means for moving said objective lens to maintain an optimum tracing condition to trace the signal track.

24. An apparatus according to claim 17, wherein said light source means irradiates the signal pit with the reading light in an oblique direction with respect to a surface of said optical recording medium.

\* \* \* \* \*